(12) United States Patent
Houmark

(10) Patent No.: US 8,233,503 B2
(45) Date of Patent: Jul. 31, 2012

(54) ARRANGEMENT AND METHOD RELATING TO SUBSCRIBER LINE CONNECTIONS

(75) Inventor: Lars Houmark, Struer (DK)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 314 days.

(21) Appl. No.: 12/666,335

(22) PCT Filed: Jul. 11, 2007

(86) PCT No.: PCT/SE2007/050520
§ 371 (c)(1),
(2), (4) Date: Dec. 23, 2009

(87) PCT Pub. No.: WO2009/008792
PCT Pub. Date: Jan. 15, 2009

(65) Prior Publication Data
US 2010/0322110 A1 Dec. 23, 2010

(51) Int. Cl.
*H04J 1/00* (2006.01)
*H04J 1/02* (2006.01)
(52) U.S. Cl. ........................ 370/485; 370/497
(58) Field of Classification Search ................ 370/252, 370/254, 463, 485, 497
See application file for complete search history.

(56) References Cited

U.S. PATENT DOCUMENTS 6,584,074 B1 * 6/2003 Vasamsetti et al. ........... 370/254
7,450,615 B2 * 11/2008 Ryals et al. ................... 370/497
2004/0095956 A1 5/2004 Henderson et al.
2007/0121619 A1 5/2007 Kimbrough et al.
2007/0183446 A1 * 8/2007 Huang .......................... 370/463

FOREIGN PATENT DOCUMENTS

GB 2386286 A 9/2003
WO 2007132162 A1 11/2007

OTHER PUBLICATIONS

International Search and Written for PCT/SE2007/050520 mailed Apr. 18, 2008.

* cited by examiner

*Primary Examiner* — Hong Cho
(74) *Attorney, Agent, or Firm* — Potomac Patent Group PLLC

(57) ABSTRACT

The present invention relates to an arrangement (10), for connecting high speed digital subscriber lines, comprising a digital subscriber line access multiplexer (1) which is adapted to be in communication with a distribution arrangement (6) interconnecting external trunk lines and internal subscriber lines. The distribution arrangement (6) is adapted to comprise or communicate with a detecting arrangement (11) adapted to detect presence of a high frequency digital signal and a connector arrangement (7) which in a second state is adapted to connect, or enable connection, of subscriber lines and a high frequency signal interface. In a first state it is adapted to disable/disconnect subscriber lines from a high frequency signal interface. The distribution arrangement (6) comprises switching or activating means for activating the second state of the connector arrangement (7) at detecting the presence of a high frequency signal.

21 Claims, 4 Drawing Sheets

ARRANGEMENT AND METHOD RELATING TO SUBSCRIBER LINE CONNECTIONS

TECHNICAL FIELD

The present invention relates to connection of high speed digital subscriber lines.

BACKGROUND

High speed digital subscriber lines such as VDSL (Very High Data Rate Digital Subscriber Line) is a technology receiving more and more attention. VDSL is an xDSL technology which provides a first data transmission over a single twisted pair of metal wires. Today the standard VDSL uses up to four different frequency bands, two for uplink traffic and two for downlink traffic. VDSL2 is a new standard increasing not only the rate of the wired (copper) network but also the reach. The VDSL2 standard is in many aspects similar to the ADSL2+ standard and it is well capable of maximizing bandwidth and bit rate. This makes it an attractive access technology for video delivery, digital video on demand and high definition TV (HDTV) to subscribers. VDSL2 is described in ITU-T Recommendation G.993.2. With the introduction of VDSL2 there is believed to be a transmission from high speed Internet, which basically is a data only service, to next generation broadband triple play services, voice, video and data. The increasing demand of high bandwidth supporting equipment required e.g. for the introduction of VDSL2, e.g. VDSL2 DSLAM (Digital Subscriber Line Access Multiplexer) leads to the need of having equipment located much closer to the end user than before due to the fact that VDSL2 has a limited reach of approximately 800 meter (as an average for 50-100 Mbps). As a consequence of the limited reach of VDSL2 (or similar), the nodes need to be located close to the customer or the end user. This means that the nodes and the equipment at the same time are small and remote which also means that a large number of sites will be deployed to serve the same number of end users.

Using for example VDSL2 or ADSL2+ having a comparatively limited reach, the sites will thus be remote and small, i.e. close to the end user. In a remote cabinet a DSLAM is connected to a main distribution frame (MDF) which is a signal distribution frame for connecting internal equipment to cables and subscriber carrier equipment which is external. An MDF is a termination point within e.g. a local telephone exchange where exchange equipment and terminations of local loops are connected by jumper wires. All copper pairs supplying services through subscriber lines are terminated at an MDF and distributed through the MDF to equipment within a local exchange, e.g. a DSLAM. To introduce for example VDSL2 manual interaction is required. Churn is often perceived as a serious problem due to the fact that manual labour is required and that is time consuming and expensive. Further problems are also associated when dealing with churn in remote deployed cabinets. Attempts have been done to solve the problems by implementing an autosensing functionality with the aim to deal with churn in such remote cabinets in a more cost effective manner.

However, as legacy xDSL already exists in the local loop, a new remote deployed VDSL2 (and ADSL2+) can not be switched in before it is actually enabled since for example a VDSL2 DSLAM comprises a low pass filter, the functionality of which will "kill" the existing xDSL service, which is very disadvantageous.

Several automated MDF arrangements have been proposed. They are of many different sizes but they have in common that they support overlay networks, more lines through the cabinet the more available xDSL subs. The proposed concepts can be blocking or non-blocking. However, they all require complex controller nodes and a management handling which make them costly, complex and complicated to manage. Thus, to switch in VDSL2 or similar with today known systems either extensive manual intervention (many small, remote sites), or a complex, expensive automated handling is needed.

SUMMARY

In order to solve one or more of the above mentioned problems, it is an object of the present invention to provide an arrangement through which high speed digital subscriber lines, for example VDSL2, ADSL2+ or similar, can be connected. Particularly it is an object to provide an arrangement through which high speed digital subscriber lines, such as for example VDSL2 or ADSL2+ or similar, can be connected or installed without manual interaction and, in addition thereto, in a cheap, efficient and fast manner. It is also an object to provide an arrangement as discussed above through which VDSL2, ADSL2+ or similar can be connected or installed without manual interaction in remote cabinets, and also in an efficient manner irrespectively of there being a very large number of small remote cabinets. An arrangement is also needed through which churn can be dealt with in a efficient and cost effective manner. It is particularly an object to provide an arrangement as discussed above which is automated and does not require any specific control arrangement or controller nodes. It is also an object to provide an arrangement through which for example VDSL2, ADSL2+ etc. can be switched in before it is enabled and without affecting any eventually already existing xDSL services. It is also an object to provide an arrangement as discussed above which does not require complex and sophisticated management handling.

It is also an object of the present invention to provide a method through which one or more of the above mentioned objects can be achieved.

Thus, in order to fulfill one or more of the above mentioned objects an arrangement for connecting a high speed digital subscriber line is provided which comprises a digital subscriber line access multiplexer adapted to be in communication with a distribution arrangement interconnecting external trunk lines and internal subscriber lines. The distribution function is adapted to comprise or communicate with a detecting arrangement. The detecting arrangement is adapted to detect presence of a high frequency digital signal. It also comprises a connector arrangement which is adapted to, in a second state, connect or enable connection between subscriber lines and a high frequency signal interface, whereas in a first state it is adapted to disable or disconnect a high frequency digital signal interface and/or to connect a narrowband network directly to internal subscriber lines. The distribution arrangement comprises switching means for activating the second state of the connector arrangement at detecting the presence of a high frequency signal, or for switching between the first and the second state depending on whether a VDSL2 (more generally a high frequency) signal is present or not.

It is an advantage of the arrangement that an automated main distribution frame system is provided. Particularly it is an advantage that VDSL2, ADSL2+ or similar can be connected or switched in remotely and automatically (i.e. without manual intervention on site) also without requiring any complex controlling functionalities or management handling. It is also an advantage that a high frequency digital subscriber line can be switched in easily in a fast and cheap manner, particularly even before enabling of the for example VDSL2 and without affecting already existing or provided xDSL services. It is further an advantage that an arrangement is provided through which churn can be handled in a cheap and easy manner also when there is a large number of small, remotely deployed cabinets.

BRIEF DESCRIPTION OF THE DRAWINGS

The invention will in the following be further described, in a non-limiting manner, and with reference to the accompanying drawings, in which.

DETAILED DESCRIPTION

Figure 1:
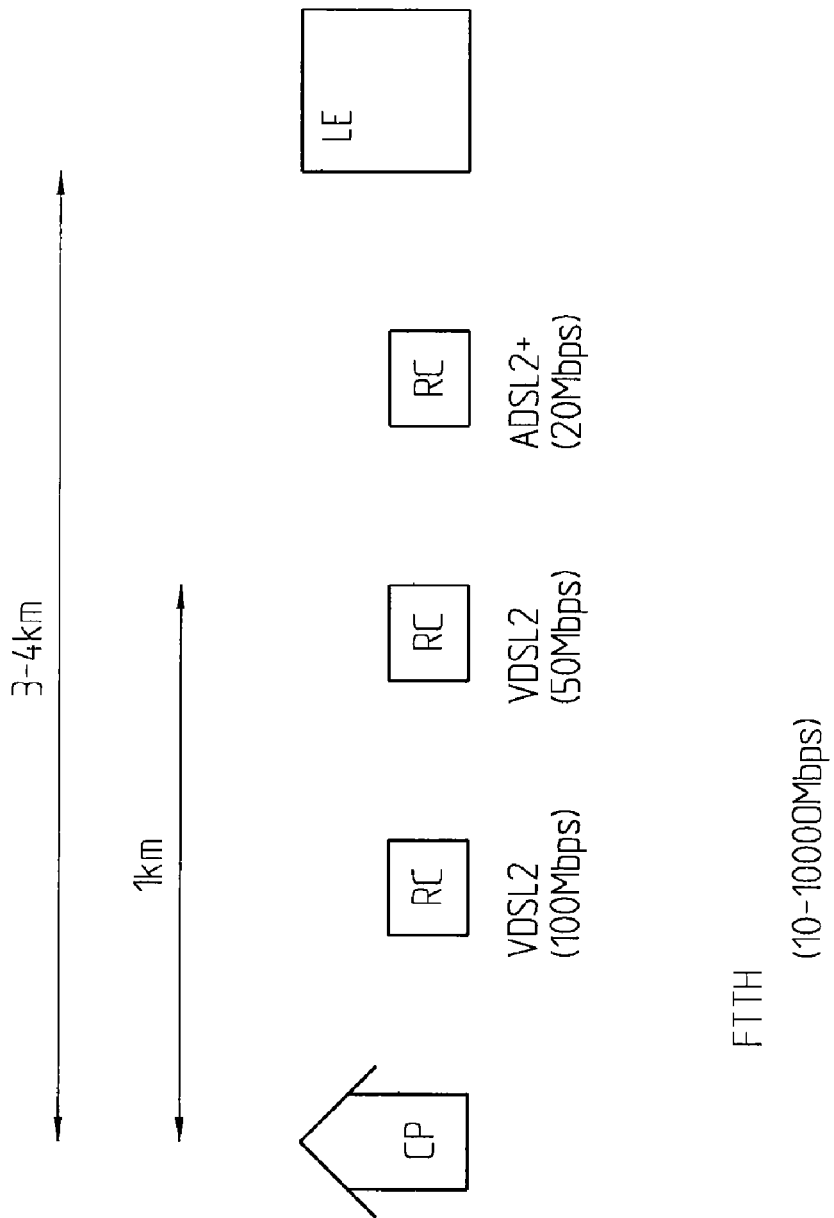
FIG. 1 is a schematical figure illustrating deployment of remote cabinets.

In an advantageous implementation the invention is based on using a simple automated distribution function, for example an MDF connector box, which is capable of enabling and/or disabling for example VDSL2 interfaces to the phone lines in a remote site cabinet. No onsite personnel is required. A detecting arrangement, for example an AutoSense function determines if a VDSL2 signal is present or not. When the VDSL2 line from the DSLAM is turned on, the connector box switches the subscriber line through a splitter of the VDSL2 DSLAM. The inventive concept may of course also be adapted to enable and/or disable connection of ADSL2+ signals or any other digital high frequency signals. In a particular implementation the connector arrangement comprises mechanical contact means for connecting/disconnecting the high frequency signal interface. The mechanical contact means may comprise a first bistable relay and a second bistable relay. In one implementation a first bistable relay is adapted to connect to an exchange of a narrowband network and the second bistable relay is adapted to connect to a customer premise. In the first state the first and second bistable relays interconnect, via a distribution arrangement, an exchange of the narrowband network and a customer premises.

The connector arrangement may alternatively comprise a contact means not based on a mechanical principle although mechanical devices seem most appropriate for the high frequencies in question.

In another implementation a connection arrangement, based on semiconductors or superconductors may be implemented, or, still further any combination of mechanical/electrical/optical means may be used.

The detecting arrangement particularly comprises an autosense function and the distribution arrangement comprises a main distribution frame incorporating said autosense function. In other implementations the detecting arrangement may be provided in communication with, but externally of, the distribution function.

The digital subscriber line multiplexer, for example a DSLAM, comprises a splitter with a high pass (HP) filter and a low pass filter (LP), wherein the low pass filter is connected to the first bistable relay and the high pass filter is connected to the second bistable relay. The high pass filter is particularly connected to an ADSL transceiver unit at or connected to a central office. In order to sense the presence of a VDSL2 signal (or similar), the detecting arrangement is adapted to receive a high frequency signal extracted from the high pass filtered signal. Particularly it is continuously monitored whether a VDSL2 signal or similar is present or not. Alternatively the monitoring may be activated with regular time intervals. The arrangement as such may be comprised in a remote cabinet where it is particularly advantageous since then problems associated with having to rely on manual interaction for a large number of small units are overwhelming. However, the concept such may also be provided in any exchange or at a central office or both, but then the advantages are not so apparent.

Similar options are of course also available for the method in a corresponding manner.

As referred to above VDSL2 is an access technology using the existing infrastructure of copper wires originally deployed for POTS (Plan Old Telephony Service) services. It can be deployed from central offices, from fibre-fed cabinets located near the customer premises or within buildings as can be seen from FIG. 1 illustrating a customer premises CP, and a local exchange. It is illustrated where VDSL2 may deploy, e.g. for 50 Mbps and for 100 Mbps in respective remote cabinets RC, at a distance of about 1 km from the CP for 50 Mbps and at a distance of about 500 meter from the CP for 100 Mbps.

VDSL2, as referred to above, is standardized in ITU-T 993.2 as an enhancement to VDSL, G.993.1, allowing transmission of asymmetric and symmetric (full duplex) aggregate data rates up to 200 Mbps on twisted pairs using a bandwidth up to 30 MHz. However, VDSL2 deteriorates considerably from a maximum of 200 Mbps to 100 Mbps at 0.5 km and 50 Mbps at 1 km but from thereon it deteriorates at a much slower rate and is still able to perform as ordinary VDSL. Starting from 1.6 km, the performance corresponds to that of ADSL2+.

Thus preferably remote cabinets have to be provided much closer to the customer premises which are small and they are required to be numerous.

Figure 2:
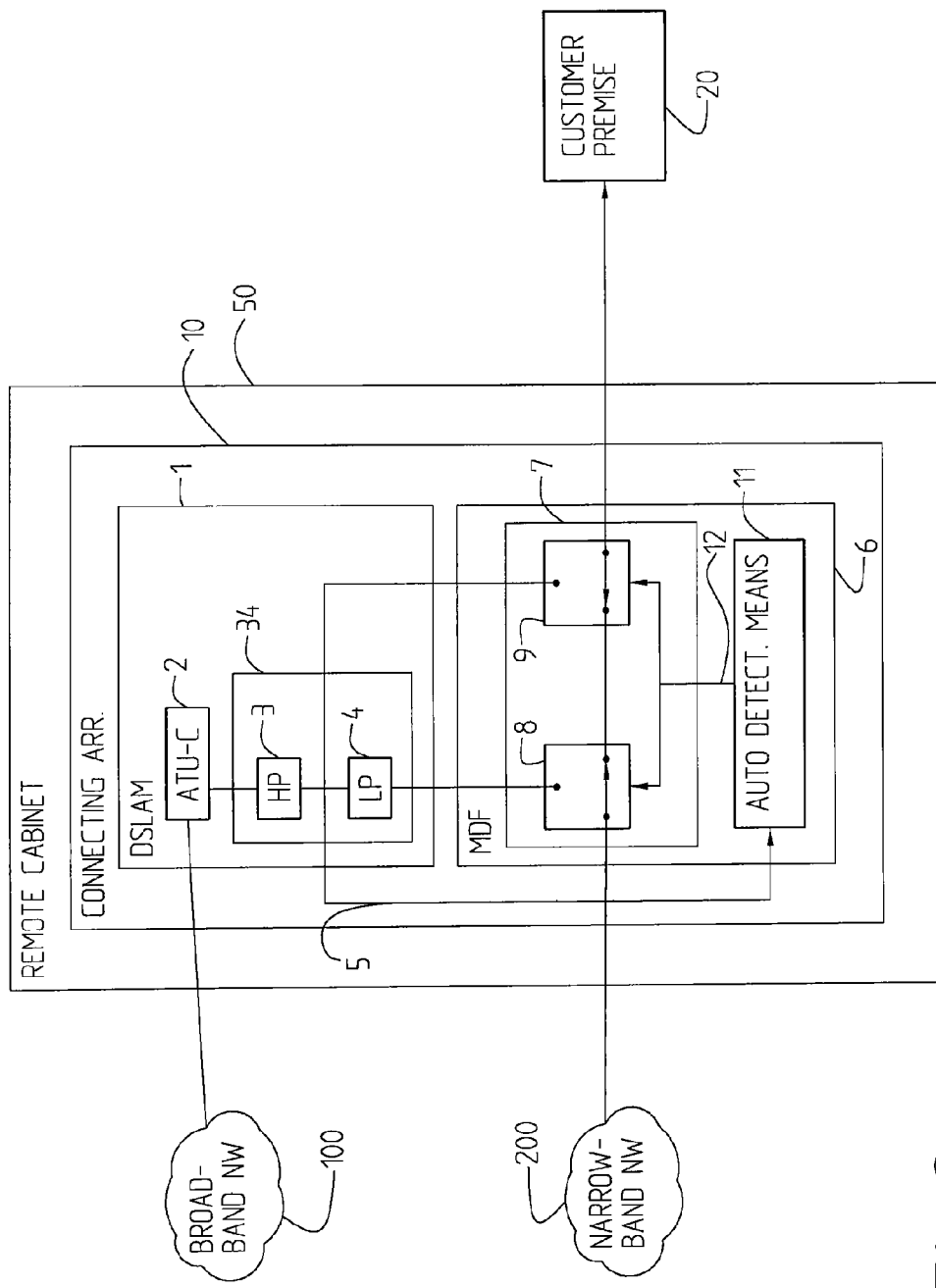
FIG. 2 schematically illustrates an arrangement according to the present invention with a connector arrangement in a first state, FIG. 3 schematically illustrates the arrangement of FIG. 2 with the connector arrangement in a second state.

FIG. 2 is a schematical block diagram showing a connecting arrangement 10 which, as discussed above, may be provided in a remote cabinet 50. The figure also shows a broadband network 100 and a narrowband network 200 and a customer premise 20. The connecting arrangement 10 may as referred to above, alternatively be provided at a central office which may be associated with the central office, associated or in communication with the central office or with a remote cabinet. It comprises a DSLAM (Digital Subscriber Line Access Multiplexer) with an ATU-C (ADSL Transceiver Unit at the Central Office end, i.e. network operator end) 2 connected to a high pass filter HP 3 which is connected to a low pass filter LP 4. The low pass filter LP 4 is connected to a first bistable relay 8 of a connector arrangement 7 provided in an MDF 6. Between the HP 3 and LP 4 a connection line is provided to a second bistable relay 9 of the connector arrangement 7 provided in MDF 6. The narrowband network 200 is also connected to the first bistable relay 8 and the customer premise is connected to the second bistable relay 9. The MDF 6 further comprises auto detecting means 11 detecting when or if there is a VDSL2 signal present, i.e. is extracted from the HP 3 as illustrated by signalling connection 5. The detecting means 11 preferably continuously monitors if there is a VDSL2 signal, and when a VDSL2 signal is detected, a switching means is activated and switches the bistable relays 8,9 from the respective first positions shown in FIG. 2, wherein the narrowband network 200 is directly through-connected to the customer premise 20, to a second state as illustrated in FIG. 3.

Figure 3:
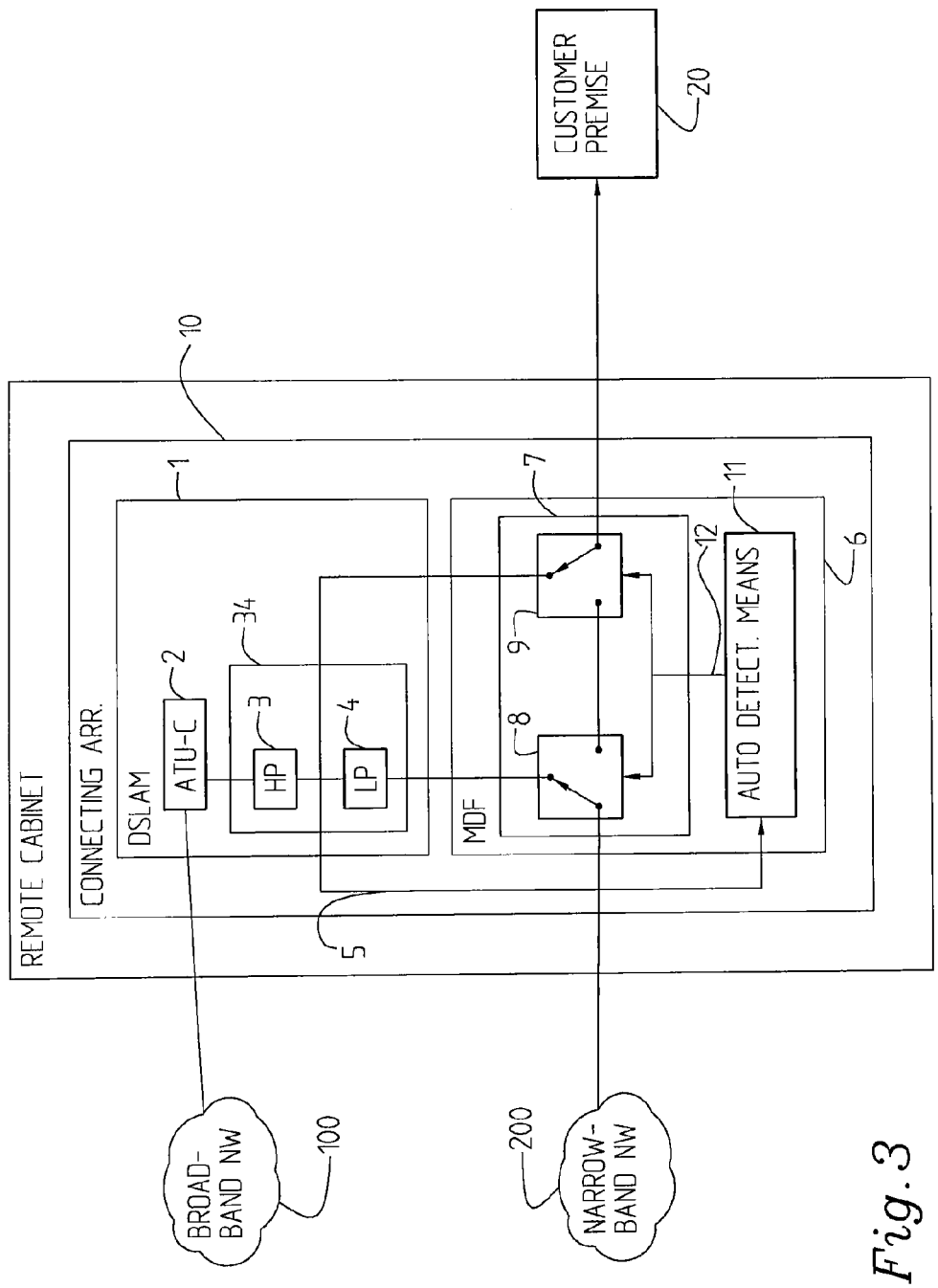

FIG. 3 is identical to FIG. 2 but with the difference that bistable relays 8,9 are in a second position switching the VDSL2 signal, i.e. the direct connection between the narrowband network 200, and the customer premise 20 via the connector arrangement 7 is replaced or extended by a connection via the splitter 34 comprising HP 3 and LP 4 of DSLAM 1. Thus, when a VDSL2 line from the DSLAM is turned on, the connector arrangement 6 switches the subscriber line through the VDSL2 DSLAM splitter 34.

The illustrated implementation comprises two bistable relays 8,9, one for each side, i.e. one for the exchange side or narrowband network side and one for the line side, i.e. customer premise. The autosense or detecting arrangement 11 comprises the logic for switching the relays in and out. The circuit can be built as a simple high pass function detecting the presence of high frequency signals (VDSL2, ADSL2+ or similar).

Figure 4:
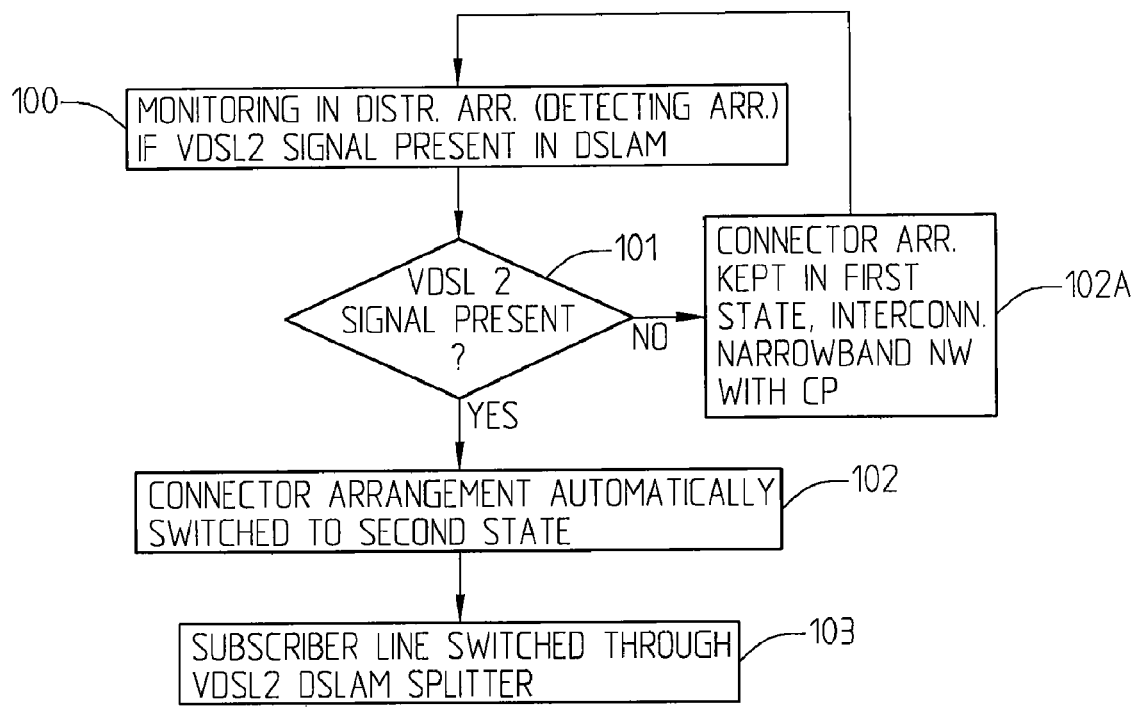
FIG. 4 is a schematical flow diagram illustrating the inventive procedure.

The procedure is very schematically illustrated in the flow diagram of FIG. 4. It is supposed that in the distributing arrangement it is continuously (or at discrete time intervals) monitored if there is any VDSL2 signal present in DSLAM, 100. It is thus established if a VDSL2 signal is present, 101. If there is no VDSL2 signal, the connector arrangement is kept in the second state, connecting the narrowband network with the CP, 102A. Monitoring proceeds and as soon as a VDSL2 signal is detected, the connector arrangement (the bistable relays) is automatically switched to the second state, 102. The subscriber line is then switched through the VDSL2 DSLAM splitter.

It should be clear that the invention can be varied in a number of ways without departing from the scope of the appended claims. Particularly it should be clear that the inventive concept is applicable also in a central office, any conventional cabinet etc. although it is most preferable for remote smaller stations or cabinets. It can also be used for different kinds of high frequency signals and the invention is not limited to the specifically illustrated embodiments.

The invention claimed is:

1. An arrangement for connecting high speed digital subscriber lines, comprising:
 a digital subscriber line access multiplexer which is configured to be in communication with a distribution arrangement interconnecting external trunk lines and internal subscriber lines,
 wherein the distribution arrangement is configured to comprise or communicate with a detecting arrangement configured to detect presence of a high frequency digital signal and a connector arrangement which in a second state is configured to connect, or enable connection, of subscriber lines and a high frequency signal interface, and in a first state is configured to disable/disconnect subscriber lines from a high frequency signal interface, wherein the distribution arrangement further comprises switching or activating means for activating the second state of the connector arrangement when detecting the presence of a high frequency signal.

2. The arrangement according to claim 1, wherein it is configured to enable and/or disable connection of VDSL2 signals.

3. The arrangement according to claim 1, wherein it is configured to enable and/or disable connection of ADSL2+ signals.

4. The arrangement according to claim 1, wherein the connector arrangement comprises mechanical contact means for connecting/disconnecting a high frequency signal interface.

5. The arrangement according to claim 4,
 wherein the mechanical contact means comprises a first connect means comprising bistable relay and second connect means comprising a second bistable relay.

6. The arrangement according to claim 5,
 wherein the first bistable relay is configured to connect to an exchange of a narrowband network.

7. The arrangement according to claim 6,
 wherein in the first state the first and second bistable relays via the distribution arrangement interconnect an exchange of the narrowband network and a customer premise.

8. The arrangement according to claim 5, wherein the second bistable relay is configured to connect to a customer premise.

9. The arrangement according to claim 1, wherein the detecting arrangement comprises an autosense function and in that the distribution arrangement comprises a main distribution frame.

10. The arrangement according to claim 9, wherein the detecting arrangement is configured to receive a high frequency high signal extracted from a high pass filtered signal.

11. The arrangement according to claim 1, wherein the digital subscriber line multiplexer comprises a splitter with a high pass filter and a low pass filter, the low pass filter being connected to the first bistable relay and the high pass filter being connected to the second bistable relay.

12. The arrangement according to claim 11,
 wherein the high pass filter is connected to an ADSL transceiver unit at or connecting to a central office.

13. The arrangement according to claim 1, wherein it comprises or is configured to be arranged in or in communication with a remote cabinet.

14. The arrangement according to claim 1, wherein it comprises or is configured to be provided in a local/private exchange.

15. The arrangement according to claim 1, wherein it is configured to be provided in or associated with a central office.

16. A method for providing an end user or a customer premise with access to a high speed digital subscriber line,
 wherein it comprises the steps of:
 detecting, in a signal distribution arrangement, presence of a high frequency signal; and
 automatically switching a connector arrangement from a first state to a second state enabling connection between a high frequency signal interface and a subscriber line connecting to the customer premise.

17. The method according to claim 16,
 wherein the automatic switching step comprises: switching the connector arrangement from a first state, in which only low frequency signal interfaces are connected to the internal subscriber line, to the second state at detection of a high frequency signal.

18. The method according to claim 16,
 wherein the switching step comprises:
 switching a first bistable relay from a first position to a second position and a second bistable relay from a first position to a second position at detection of a high frequency signal such that high a frequency signal path from a broadband network via a high pass filter and a low frequency signal path from a narrowband network, via a low pass filter, are provided to the customer premise.

19. The method according to claim 16, wherein it is configured to detect high frequency signals comprising VDSL2 or ADSL2+ signals.

20. The method according to claim 16, wherein it comprises the steps of:
- providing a high pass filtered, extracted, high frequency signal to the distribution arrangement; and
- detecting the presence of the high frequency signal.

21. The method according to claim 16, wherein it comprises:
- connecting the high frequency signal interface of a DSLAM to a distributing arrangement in a remote cabinet, in a private local exchange or in a central office, to a customer premise.

* * * * *